United States Patent [19]

Prinzing

[11] 4,094,654

[45] June 13, 1978

[54] CABIN FOR AN ELECTROSTATIC POWDER COATING INSTALLATION

[75] Inventor: Robert Prinzing, St. Gallen, Switzerland

[73] Assignee: Gema AG Apparatebau, St. Gallen, Switzerland

[21] Appl. No.: 722,134

[22] Filed: Sept. 10, 1976

[30] Foreign Application Priority Data

Sep. 29, 1975 Switzerland .................. 12578/75

[51] Int. Cl.² .............................................. B01D 46/04
[52] U.S. Cl. ................................. 55/290; 98/115 SB; 118/326; 118/634; 118/DIG. 7
[58] Field of Search ............. 55/290, 338, 293, 385 R, 55/400, 467; 98/115 SB; 118/326, 634, DIG. 7

[56] References Cited

U.S. PATENT DOCUMENTS

| 3,864,107 | 2/1975 | Baigas, Jr. .................. 55/290 |
| 3,902,455 | 9/1975 | Lehmann et al. ................. 98/115 SB |

FOREIGN PATENT DOCUMENTS 511,455  8/1939  United Kingdom ............... 55/290

Primary Examiner—Bernard Nozick
Attorney, Agent, or Firm—Werner W. Kleeman

[57] ABSTRACT

A cabin for an electrostatic powder coating installation comprising a filter communicating with an internal compartment or space of the cabin, the side of the filter facing away from such internal compartment being exposed to the action of a negative pressure. A cleaning device is operatively associated with the filter. The cleaning device and the filter are relatively movable with respect to one another. The filter is constructed as a rotatable filter drum arranged in a chamber bounding and connected with the internal compartment of the cabin. There also is provided a stationary suction nozzle spanning the filter drum along a generatrix or surface line, and the suction nozzle is connected via a separator with a suction blower.

9 Claims, 2 Drawing Figures

4,094,654

CABIN FOR AN ELECTROSTATIC POWDER COATING INSTALLATION

BACKGROUND OF THE INVENTION

The present invention relates to a new and improved construction of cabin for an electrostatic powder coating installation which is of the type comprising a filter communicating with the internal space or compartment of the cabin, the side of the filter facing away from the internal compartment of the cabin is exposed to the action of a negative pressure, there also being provided a cleaning device operatively associated with the filter, this cleaning device and the filter being relatively movable.

According to a heretofore known cabin of this type, as disclosed in U.S. Pat. No. 3,902,455, the filter is designed in the form of an endless revolving filter band, the upper run of which forms at one face thereof the floor of the cabin and the other face of which travels over a suction vat or trough connected with an exhaust air-suction blower. The filter band extends over the length of the cabin out of the same and the cleaning device arranged externally of the cabin acts upon the end of the upper run of the filter band which travels out of the cabin. The cleaning device primarily serves for reclaiming the excess coating powder deposited upon the floor of the cabin. Due to its construction the cabin requires a considerable installation area and therefore is especially suitable for use with coating lines having a number of spray stations arranged along the lines, at which there are moved past by means of a conveyor the articles which are to be coated. While in principle it would be possible to reduce the cabin to that size which is suitable for instance for a spray gun which can be manually operated, apart from the spatial requirements, such would be associated with drawbacks of a different nature. In particular, the quantity of coating powder which must be placed in circulation is large in comparison to the quantity used for the actual coating of the articles, so that when using a coating powder of a certain quality, for instance a given color, only for a brief period of time, considerable residual quantities of powder must be tolerated which, when switching to a different quality or type of powder, first must be removed from the cabin and the associated components. Consequently, it should be appreciated that the prior art cabins are really not very suitable when employed for a mode of operation requiring relatively frequent change of the quality or type of the coating powder, rather are more adapted for a mode of operation allowing for the use of the same type or quality of powder over longer time spans.

SUMMARY OF THE INVENTION

Hence, with the foregoing in mind it is a primary object of the present invention to provide a new and improved construction of cabin for an electrostatic powder coating installation which is not associated with the aforementioned drawbacks and limitations of the prior art constructions.

Another and more specific object of the present invention aims at the provision of a new and improved construction of cabin of the previously mentioned type which is particularly suitable, although it is to be expressly understood not exclusively, for smaller coating installations, namely for those employing spray guns which are manually operated and wherein the change of the quality or type of the coating powder can be effected with minimum cleaning work.

Now in order to implement these and still further objects of the invention, which will become more readily apparent as the description proceeds, the present invention proposes a cabin construction of the previously mentioned type which is manifested by the features that the filter is constructed as a rotatable filter drum arranged in a chamber bounding at and connected with the inner compartment or space of the cabin. Further, a stationary suction nozzle spans the filter drum along a surface line, and this suction nozzle is connected by a separator with a suction blower.

The chamber and the therein arranged filter drum preferably essentially extend over the entire length of the cabin and advantageously are disposed beneath its floor. Additionally, the chamber can be operatively connected with the cabin inner space or internal compartment by means of a slot which likewise essentially extends over the entire length of the cabin. Of particular advantage is a construction where the cabin floor is formed by two guide surfaces arranged to extend downwardly and convergingly with regard to one another, wherein the lower lengthwise edge of the first guide surface is arranged in spaced relationship above the lower lengthwise edge of the second guide surface, so that both of the lengthwise edges delimit the slot through which the chamber is connected with the inner space or compartment of the cabin, and the chamber itself is located below the first guide surface.

Advantageously, the lower edge of the aforementioned first guide surface is at an elevational position between the lengthwise axis and the lowermost surface line or generatrix of the filter drum, so that the slot bounded at the top by such lower edge is primarily located opposite the lower region of the outer surface or jacket of the filter drum. In this instance, the direction of rotation of the filter drum advantageously should be chosen such that its section confronting the slot essentially moves from the bottom towards the top. In this case, it is beneficial to arrange the suction nozzle spanning the filter drum at a height which is disposed between its lengthwise axis or shaft and its highest generatrix or surface line.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
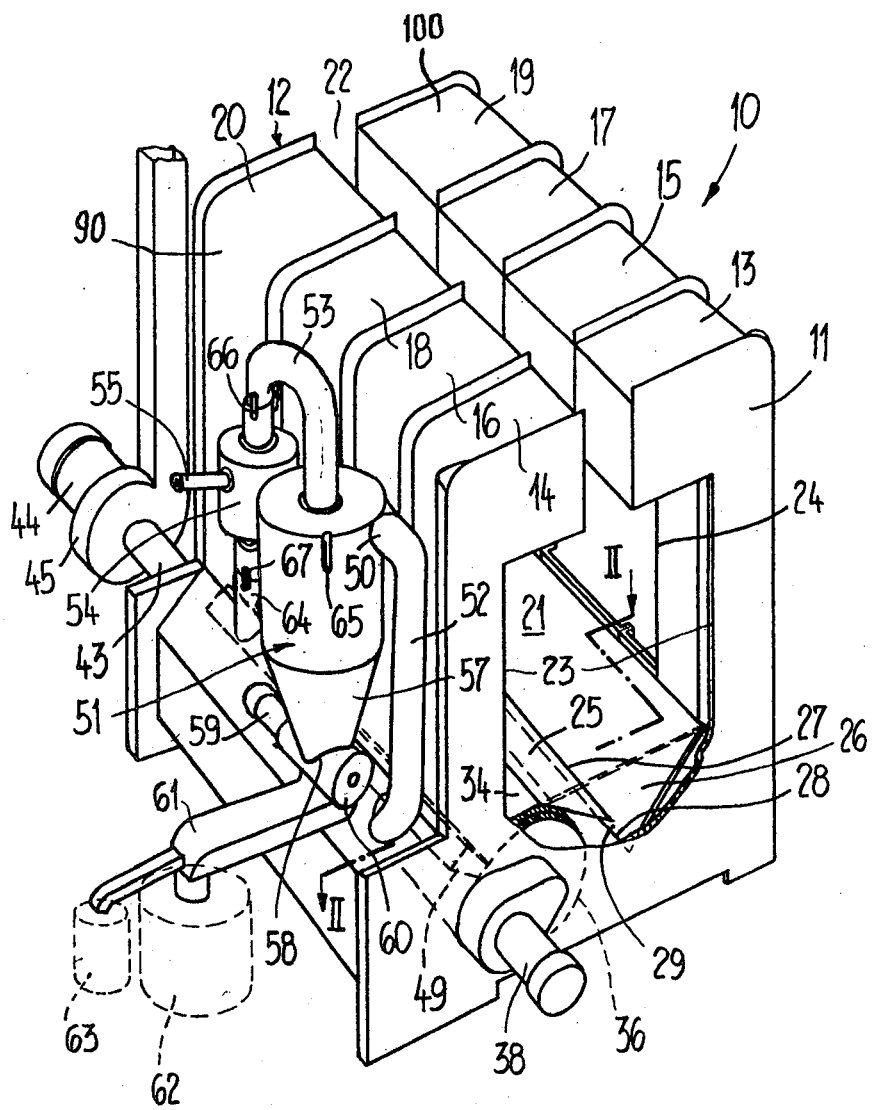
FIG. 1 is a simplified perspective illustration, with partially broken away end wall, of an exemplary embodiment of cabin for an electrostatic powder coating installation designed according to the present invention.

Describing now the drawings, the cabin, generally designated by reference character 10 in FIG. 1, is essentially limited in its length by the two end walls 11 and 12. Between the end walls 11 and 12 there are arranged a number of — in this case twice four — wall elements 13, 14, 15, 16, 17, 18, 19 and 20 which, in not particularly illustrated but conventional manner, are secured at their chamfered or bevelled edges to one another as well as at the end walls 11 and 12 respectively. Each of the wall elements forms a part of the associated side wall 90 and a part of the ceiling 100 of the inner space or compartment 21 of the cabin 10. This ceiling 100, in the embodiment under consideration, is not closed, rather possesses a throughpassage or opening 22 extending over the entire length of the cabin 10, through which there can extend the suspension system of a conveyor (but not shown) at which there are suspended the articles or objects which are to be transported into the cabin for coating the same.

In the end wall 11 — and possibly also in the end wall 12 — there is cut an inlet- and outlet window 23, and in the vertical sections of the wall elements 15, 17 which face away from the observer, there is cut-out a further window 24. This additional window 24 for instance enables an operator of the equipment, from the side of the cabin 10, to coat an article located therein with the aid of an electrostatic powder spray gun.

Figure 2:
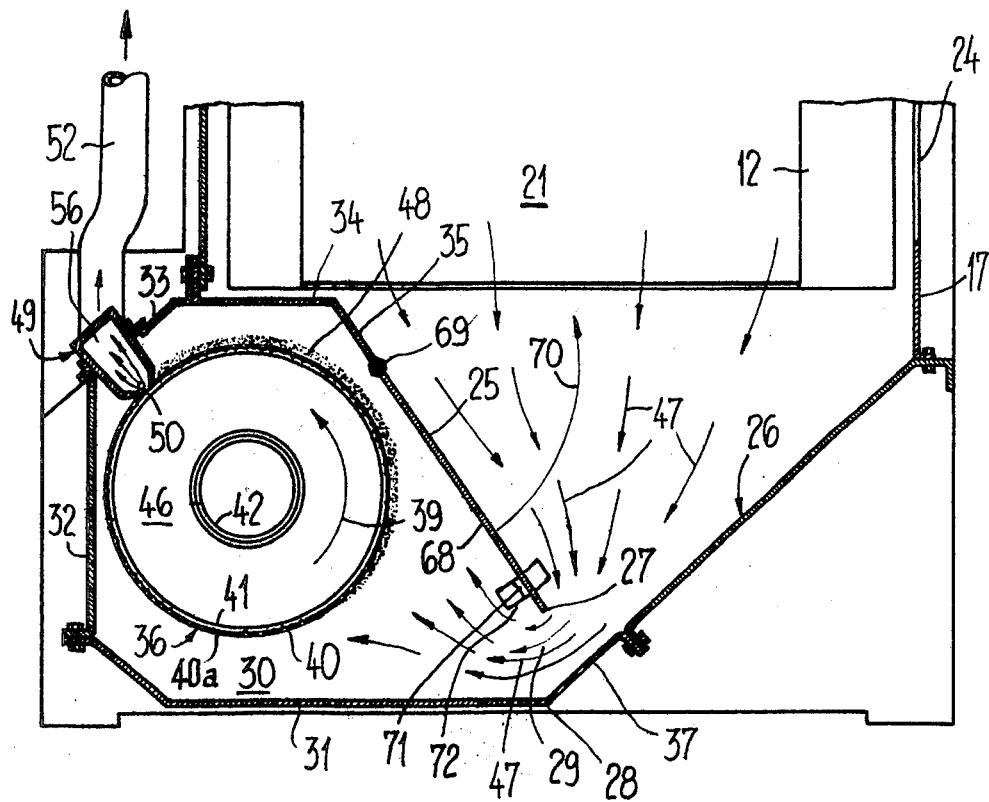
FIG. 2 is a simplified sectional view, taken substantially along the line II—II of FIG. 1.

As been seen by referring to FIG. 2, the floor of the cabin 10 is essentially formed by two downwardly extending converging guide surfaces or guide elements 25, 26, the lower lengthwise edges 27 and 28, respectively, of which do not contact one another, rather are arranged in spaced superimposed relationship, so that there is formed a substantially slot-shaped throughpassage or opening 29. This throughpassage 29 leads to a chamber 30 located below the guide surface 25, this chamber 30 is bounded in axial direction by the end walls 11, 12 and furthermore by the additional sheet metal components or the plates 31, 32, 33 and 34 or equivalent structure. A flexed section or portion 35 of the plate or sheet metal component 34 simultaneously forms part of the guide surface 25 and a flexed section or portion 37 of the sheet metal component 31 simultaneously forms the lower region of the guide surface 26. Hence, the chamber 30 extends over the entire length of the cabin and by means of the throughpassage or opening 29 likewise communicates over the entire length thereof with its internal space or compartment 21.

In the chamber 30 there is arranged a filter drum 36 which extends between the end walls 11 and 12 and is rotatably mounted in any suitable manner within such chamber. The end of such rotatably mounted filter drum 36 which is located closer to the observer of the drawing of FIG. 1 is operatively coupled with a transmission motor 38 or other suitable drive, which rotates the filter drum 36 continually in the direction of the arrow 39 (FIG. 2) at a low rotational speed. The other end or end face of the filter drum 36 comprising for instance a permeable support cylinder 41 (for instance formed of wire mesh or perforated sheet metal) covered at its outside surface for example by a filter 40 (cloth or fleece) is connected through the agency of a throughpassage or opening 42 formed in the end wall 12 with a suction line or conduit 43 (FIG. 1) of an exhaust air-suction blower 45 driven by an electric motor 44. The internal space or compartment 46 of the filter drum 36 and therefore the one side or face of the filter 40 is thus always exposed to the action of the negative pressure developed by the exhaust air-suction blower 45, whereas the external face or outer surface 40a of the filter 40 confronts the chamber 30 and via such as well as the throughpassage 29 confronts the internal compartment 21 of the cabin 10. The exhaust air-suction blower 45, as has been indicated by the arrows 47 of FIG. 2, therefore sucks air without interruption through the filter 40 out of the internal space or compartment 21, and the maximum flow velocity is reached approximately at the region of the throughpassage or opening 29. The excess coating powder conveyed by this exhaust air does not in the meantime arrive at the exhaust air-suction blower 45, rather remains adhering to the external face or outer surface 40a of the filter 40 and at that location forms a rather loose, even though adherent layer 48.

The filter drum 36 has operatively associated therewith a suction nozzle 49 which extends over its entire length, the suction gap 50 of which bears quite snugly or with very little play at the surface 40a of the filter 40. The suction nozzle 49 is connected via a conduit 52 leading to the inlet 50 of a cyclone separator 51 as well as via a conduit 53 extending from such cyclone separator with a powerful suction blower 54. In the embodiment under discussion, the suction blower 54 is designed as a pressurized or compressed air-operated injector blower devoid of movable parts, preferably as a blower which is commercially available, for instance, under the commercial designation "Air Mover" and advantageously employing the well-known Coanda-effect. The compressed air-connection of the blower 54 has been designated by reference character 55. The operating characteristic of the suction blower 54, in comparison to that of the exhaust air-suction blower 45, is chosen such that the former produces in the nozzle space 56 of the suction nozzle 49, for a conveyed quantity which is smaller by about a tenth power, a negative pressure (in the order of magnitude of approximately 200 mmWS) which is larger by at least ten times than is developed by the latter in the internal space 46 of the filter drum 36 (in the order of magnitude of about 10–15 mmWS). Consequently, the suction nozzle 49 acts like a vacuum cleaner at the outer face or surface 40a of the filter 40, removes therefrom the layer 48 and conducts the excess powder which is temporarily retained and collected by the filter 40 to the cyclone separator 51.

In the cyclone separator 51 the powder is separated from the air current and collected at the lower downwardly conically tapering collecting container 57. The outlet 58 of the collecting container 57 is connected via a sluice — in the case under discussion by means of a bucket wheel or cell wheel sluice 60 (in FIG. 1 there is only visible the housing thereof) driven by a small motor 59 — with a conveying channel 61 in which there is advantageously arranged a not particularly illustrated but conventional jarring sieve. The cell wheel sluice 60 ensures that the negative pressure produced by the suction blower 54 and prevailing within the cyclone separator 51 and effective at the suction nozzle 49, notwithstanding the removal of the powder which has been reclaimed and retained in the collection container 57, remains intact. Additionally, due to the arrangement of the jarring or vibration sieve in the conveying channel 61 there can be simultaneously separated from the powder continuously removed from the collection or collecting container 57 a fraction ready for reuse and collected in a container 62, whereas the no longer usable coarse grain waste is delivered to a waste vessel 63 or the like.

The cyclone separator 51 is not capable of separating-out all of the powder delivered by the suction nozzle 49. A small percentage arrives by means of the suction blower 54 at its outlet or discharge 64. This outlet 64, as shown only schematically in FIG. 1, leads back to the chamber 30, so that the air conveyed by the suction blower 54 and containing a small residual amount of powder again impinges the outer face or surface of the filter drum 36 and thus the filter 40.

From what has been discussed above it will be apparent that the described cabin 10 possesses a simple and compact construction, wherein the length thereof can be accommodated without any great difficulty and with very little expenditure to the conditions prevailing at the place of erection. It is adequate to introduce one or a number of additional pairs of wall elements in the manner of the wall elements 15–18 and to appropriately increase the length of the filter 36 as well as the suction nozzle 49, both of which preferably are formed of elements likewise abutting one another is axial direction. Moreover, the air sucked-out of the internal compartment or space 21 of the cabin 10 through the exhaust air-suction blower 45, irrespective whether it emanates from the region of the one or other end wall, i.e. the one or other end of the cabin, always impinges at a section of the filter 40 which has been freshly cleaned by the suction nozzle 49 and is continually moved past the throughpassage 29.

Also only a limited amount of cleaning work is necessary when changing the powder which is used. The exhaust air-suction blower 45, the suction blower 54 and the motors 38 and 59 are turned-on for a short period of time after the coating work has been terminated and the inside of the cabin is cleaned, for instance with a jet of compressed air. Then, the inside of the cyclone separator 51 can be cleaned, the cover of which, for easier removal, for instance is equipped with quick-release or snap closures 65, and equally there can be cleaned the interior of the suction blower 54 from which there can be easily disconnected both the conduit 53 as well as the outlet conduit 64 by means of the quick-release or snap closures 66 and 67 respectively.

Also the maintenance of the cabin 10 requires very little work. The only component of the cabin 10 requiring any maintenance, and with the illustrated embodiment not accessible from the outside (although such would be readily possible by simply constructing the sheet metal component 32 as a trap-door), is the filter drum 36. The major portion of the guide surface 25 is formed by a flap 68 which can be hingedly connected by means of a pivot or hinge 69 or the like at the free end edge of the flexed section 35 and thus can be upwardly rocked in the direction of the arrow 70. Thus, the filter drum 36, for instance for the purpose of replacing the filter 40, is accessible. In the operating position the flap 68 bears against the stops 71 which protrude inwardly from the end walls 11 and 12 respectively, and which, in turn, can be displaceable and fixable in a slotted segment 72. In this way it is possible to adjust the width of the throughpassage or opening 29 to the conveying capacity of the exhaust air-suction blower 45 and/or to the permeability of the filter 40 in such a manner that the flow velocity in the throughpassage or opening 29 is sufficiently great to safeguard against the formation of an undesired deposition of powder at the lower region of the guide surface 26. Finally, it is mentioned that the width of the throughpassage or opening 29 may advantageously amount to a fraction of the diameter of the filter drum 36.

While there are shown and described present preferred embodiments of the invention, it is to be distinctly understood that the invention is not limited thereto, but may be otherwise variously embodied and practiced within the scope of the following claims. Accordingly,

What is claimed is:

1. A cabin for an electrostatic powder coating installation, comprising in combination, means defining an internal compartment, means defining a chamber, a rotatable hollow filter drum arranged within said chamber, said rotatable filter drum having an axis, an inner side and outer side, guide means defining a slot-shaped opening connecting said internal compartment with said chamber for directing air and oversprayed powder transversely to said filter drum axis, said axis being disposed substantially parallel to said slot-shaped opening, means for rotating the rotatable filter drum about its axis, suction means for subjecting said inner side of the filter drum to the action of a negative pressure and for causing air and oversprayed powder to flow from said internal compartment through said slot-shaped opening into said chamber and to impinge on said outer side of the filter drum, a stationary suction nozzle spanning the outer side of the filter drum along a surface line thereof for removing oversprayed powder therefrom, a suction blower and a separator for connecting the stationary suction nozzle with the suction blower.

2. The cabin as defined in claim 1, wherein the chamber and the filter drum arranged therein extend essentially over the length of the cabin.

3. The cabin as defined in claim 1, wherein the cabin has a cabin floor, the chamber is arranged beneath said cabin floor.

4. A cabin for an electrostatic powder coating installation, comprising a cabin containing an internal compartment, means defining a chamber bounding the internal compartment of the cabin and communicating therewith, a rotatable filter drum arranged in said chamber and communicating with the internal compartment of the cabin, said rotatable filter drum having a side facing away from the internal compartment of said cabin, means for subjecting said side of the filter drum to the action of a negative pressure, a cleaning device including a stationary suction nozzle spanning the filter drum along a surface line thereof, means for rotating the rotatable filter drum, a suction blower, a separator for connecting the stationary suction nozzle with the suction blower, the chamber and the filter drum arranged therein extending essentially over the length of the cabin, means providing a throughpassage extending essentially over the length of the cabin, the chamber communicating via the throughpassage with the internal compartment of the cabin, said cabin having a cabin floor, said chamber being arranged beneath the cabin floor, said cabin floor possessing two downwardly directed and converging guide surfaces defining first and second guide surfaces, a lower lengthwise edge of the first guide surface being arranged in space relationship above a lower lengthwise edge of the second guide surface, both of said guide surfaces bounding said throughpassage, and the filter drum is arranged beneath the first guide surface.

5. The cabin as defined in claim 4, wherein the first guide surface has a portion thereof structured to be pivotable.

6. The cabin as defined in claim 4, wherein the width of the throughpassage amounts to a fraction of the diameter of the filter drum.

7. The cabin as defined in claim 4, wherein the lower lengthwise edge of the first guide surface is arranged elevationally between a lengthwise axis and a lowermost surface line of the filter drum.

8. The cabin as defined in claim 7, wherein the means for rotating the rotatable filter drum imparts a direction of rotation thereto such that a section thereof confronting the throughpassage moves from the bottom towards the top.

9. The cabin as defined in claim 8, wherein the suction nozzle spans the filter drum at an elevational position located between its lengthwise axis and the highest surface line thereof.

* * * * *